Oct. 26, 1965        J. L. BENDER ETAL        3,214,360
ELECTROLYTIC CAVITY SINKING APPARATUS
Filed June 21, 1960        2 Sheets-Sheet 1
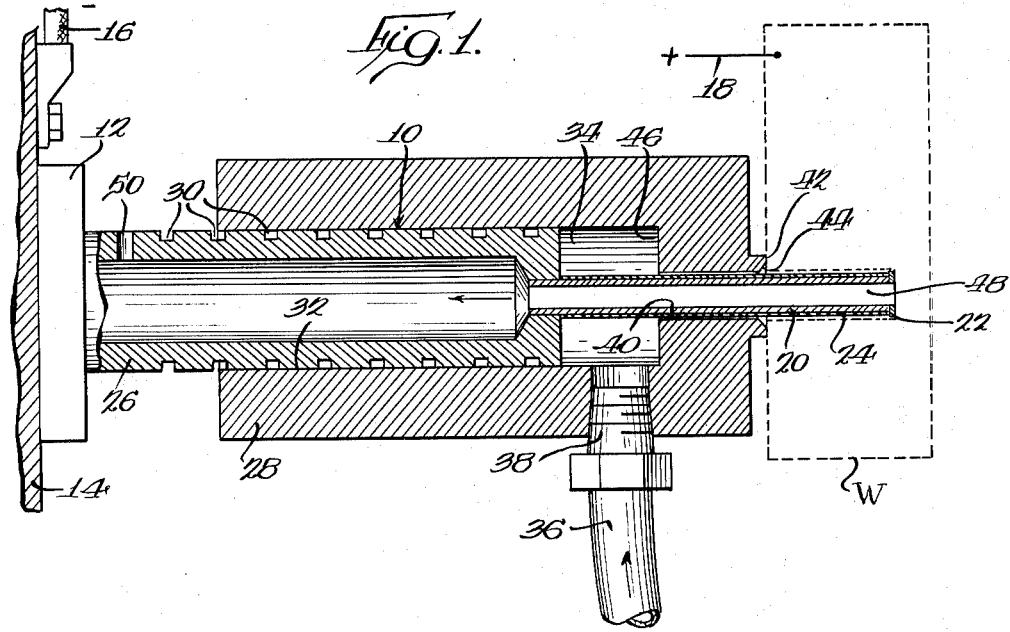
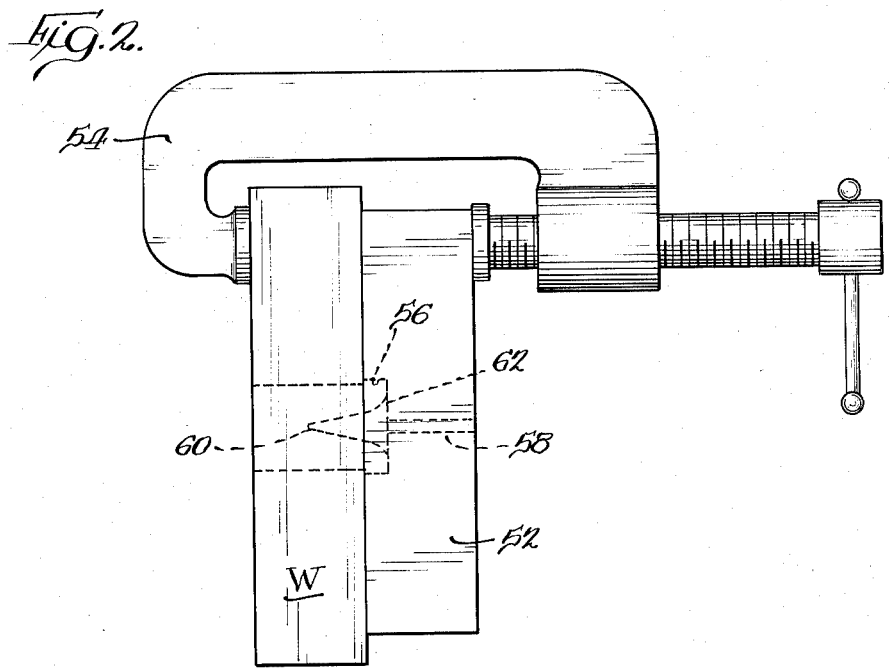
INVENTORS:
Joseph L. Bender
Lynn A. Williams
By Wupper, Tradolph & Love
Attys

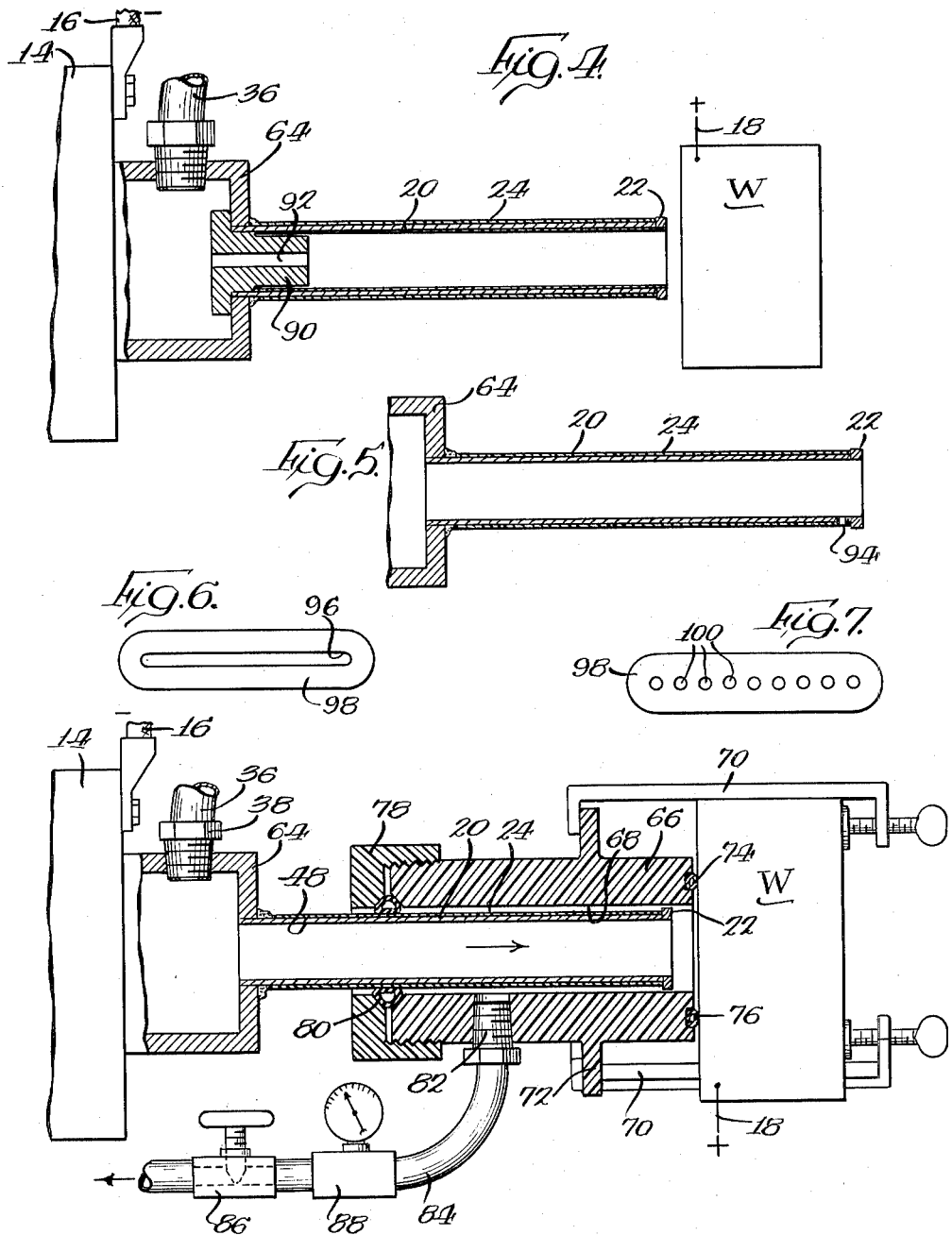

United States Patent Office 3,214,360
Patented Oct. 26, 1965

3,214,360
ELECTROLYTIC CAVITY SINKING APPARATUS
Joseph L. Bender, Wheeling, and Lynn A. Williams, Winnetka, Ill., assignors to Anocut Engineering Company, Chicago, Ill., a corporation of Illinois
Filed June 21, 1960, Ser. No. 37,766
1 Claim. (Cl. 204—224)

The present invention relates generally to electrolytic cavity sinking or shaping apparatus and method of the type disclosed in the copending applications of Lynn A. Williams, Serial No. 772,960, filed November 10, 1958, for "Electrolytic Shaping," issued into Patent No. 3,058,-895, dated October 16, 1962, and Lynn A. Williams and James E. Davis, Serial No. 863,246, filed December 31, 1959, for "Control and Operating System for Electrolytic Hole Sinking."

The present invention is concerned with controlling the action of the electrode and the electrolyte so as substantially to eliminate or reduce troublesome lateral vibration of electrodes used in both cavity sinking and workpiece shaping operations.

In general, apparatus of the type disclosed in the foregoing applications includes a fixture for securely mounting the workpiece, a hollow electrode having a working tip of electrically conductive material, a ram head mounting the electrode for movement toward the workpiece, an electric power supply connected to the electrode and to the workpiece so as to make the workpiece anodic and the electrode cathodic and capable of delivering a low voltage (5 to 15 volts), high-density (500 to 8000 amperes per square inch) direct current, and a source of electrolyte capable of delivering electrolyte at a high velocity in the work gap between the electrode and the workpiece and at a pressure of about 150 to 200 pounds per square inch.

It has been found from practical experience that one of the difficulties in obtaining the maximum rate of penetration of the electrode into the workpiece is that the electrode tends to vibrate laterally, thereby causing short-circuiting against one of the side surfaces, either on the internal bore of the electrode or externally, or both. It now has been discovered that one of the things which causes or effects the lateral vibration is the tendency to store energy within the column of liquid inside the electrode. The cause of the oscillation which usually occurs at a frequency within the sonic range appears to be the fact that the electrolyte is being delivered in the work gap at an exceedingly high velocity and under a very high pressure in the range, as previously stated, of 150 to 200 pounds per square inch. When it is considered that the work gap between the electrode and the surface of the workpiece being acted upon is in the order of .002", it is not surprising that there is a feed-back oscillation in the column of liquid in the electrode's passageway. It is a principal object of the present invention to provide means associated with the electrode and the feed of electrolyte to dampen or break up this oscillation and thereby eliminate the lateral vibration of the electrode within the hole being formed.

Another problem which has been encountered is in connection with through bores or holes being formed in a workpiece. When the electrolyte is fed to the workpiece through the bore of the electrode, then as the electrode approaches the remote or exit side of the workpiece, it will usually break through in some one area before it breaks through all the way around. This is due to the almost unavoidable irregularities in the surface of the workpiece. When this occurs, the electrolyte then finds its way out through the broken through opening at the exit side, instead of turning back over the working tip of the electrode to return along its axis to the entry surface of the workpiece. This is detected by observing a jet of electrolyte squirting through an opening on the exit surface of the workpiece. In the copending application Serial No. 772,960 arrangements are disclosed to prevent this. One of them is to provide a dummy piece fastened to the exit surface of the workpiece by some adhesive such as waterglass. In another form, a backup material of soft rubber is used. It is obvious that these arrangements involve some inconvenience, and in some cases they are very difficult to use because the exit surface of the workpiece may lead into a more or less closed chamber which is not readily accessible. Unless some form of backup device is used, and unless the electrode is advanced so that its working tip has passed completely through the workpiece and into the backup device, there will be in the cavity adjacent the exit surfaces a sharp, inturned lip.

It is, therefore, another primary object of the present invention to provide a new arrangement for feeding the electrolyte and advancing the electrode which will overcome the difficulties encountered in the breakthrough of the electrode from the exit side of the workpiece.

It should be noted that to a large extent the arrangement for overcoming the lateral vibration also improves the exiting characteristics of the electrode feed.

Another object is to provide new and improved electrolytic cavity sinking apparatus wherein the electrolyte is fed along the outer surface of the electrode to the work gap to exit through the bore of the electrode.

Another object is to provide a new and improved electrolytic cavity sinking apparatus and method wherein the electrolyte is fed in such fashion that any column of electrolyte within the electrode is inhibited against longitudinal oscillation which will provide lateral vibration of the electrode.

Other objects and advantages will become apparent from the following description taken in conjunction with the accompanying drawings, wherein:

FIG. 1 is a schematic view of a portion of an electrolytic cavity sinking apparatus illustrating one form of the present invention;

FIG. 2 is a schematic view of an arrangement for backing up the cavity in the workpiece to assist in making clean through holes;

FIG. 3 is a view similar to FIG. 1, showing another form of cavity sinking apparatus;

FIG. 4 is a view similar to FIGS. 1 and 3 showing an electrode particularly adapted for inhibiting longitudinal oscillations in the electrolyte column;

FIG. 5 is a longitudinal sectional view through another form of electrode useful in inhibiting longitudinal oscillations of the column of electrolyte; and FIGS. 6 and 7 are comparative views of the exit end of an electrode depicting an arrangement for inhibiting longitudinal oscillations of the electrolyte column, and therefore lateral vibration of the electrode.

In the drawings, there has been shown only so much of an electrolytic cavity sinking machine or apparatus as is necessary to an understanding of the present invention. Such apparatus is more completely disclosed in the aforementioned patent applications Serial Nos. 772,960 and 863,246.

Referring now to FIG. 1, the apparatus includes an electrode structure, indicated generally by the reference character 10, which is fastened by a flange 12 to a ram plate 14. The ram plate is mounted on the forward end of a ram structure, and is insulated therefrom by an insulating block. The ram structure includes a movable member powered from a positively driven screw (not shown) which will advance the electrode 10 at a constant speed into work W. The machine includes an electric power supply (not shown), the output of which is connected by a cable or conductor 16 to the ram plate 14 and electrode 10, and a conductor 18 to the work through the table and work holder which normally supports the workpiece W in place. The power supply is capable of delivering, as previously mentioned herein, a low-voltage, high-density direct current in a sense to make the electrode 10 negative and the workpiece W positive.

The electrode structure 10 includes the electrode proper at 20 having a working tip 22 of slightly greater diameter than the shank or body of the electrode 20. The shank or body is coated, at least on its exterior surface, with an insulating material 24, which may be a vitreous enamel or an epoxy resin. If the electrode is of any substantial diameter, the interior also will be provided with a coating of insulation similar to the insulation 24.

The electrode 20 is made integral with or commonly mounted in an enlarged tubular, piston-like portion 26 which serves as the electrode mount, and which in turn is secured to the flange 12. Mounted on the electrode mount 26 is a bushing 28 which may be made of a plastic material impervious to chemical deterioration or damage by heat. Experimentally, an acrylic resin has been used and found to be satisfactory, but for a permanent insulation a more durable material, such as Teflon resin, is preferred. The feed bushing 28 is mounted so that it slides easily over the electrode mount 26 and has a clearance therewith in the order of .002". To prevent excessive leakage of electrolyte a number of square-bottomed, annular grooves 30 are cut into the external surface of the electrode mount, and they provide a sufficient seal to prevent excessive leakage of electrolyte between the feed bushing 28 and the mount 26. The feed bushing is made in such a way that at the inner end of its cylindrical bore 32 there is provided an annular opening 34 into which the electrolyte is fed under pressure through a supply line 36 and a fitting 38. The supply line 36 is connected to a source of electrolyte under pressure (not shown) which includes a supply tank and pump capable of delivering electrolyte at a pressure of 150 to 200 pounds per square inch.

The bushing 28 is formed with a bore 40 at its exit end which is just large enough to permit being slipped over the working tip 22 of the electrode 20 so that there is a clearance of several thousandths of an inch between the bore 40 of the bushing and the shank of the electrode 20, thereby permitting the easy and adequate flow of electrolyte along the side wall of the electrode and down over the working tip 22. At its exit end the guide bushing 28 is relieved to provide a sealing shoulder 42 of reduced cross sectional area to permit sealing against the entry surface of the workpiece W. Within the confines of the shoulder there is a recess 44 which is provided to accommodate the tip 22 of the electrode to prevent its coming into contact with the entry surface of the workpiece W when the electrode is first advanced toward the workpiece and the initial erosion of the workpiece is being effected.

The feed bushing 28 is more or less permanently mounted on the electrode mount 26, and the entire assembly is then brought into close proximity with the workpiece W with the bushing extended so that its sealing shoulder 42 touches the workpiece while the working tip 22 of the electrode is slightly recessed within the bushing at 44. As electrolyte is fed through the flexible tube 36 and fitting 38 into the chamber 34, the effect is to create a hydrostatic force on the surface 46 of the chamber 34, thus urging the bushing into sealing engagement with the entry surface of the workpiece. Since the area of the frontal surface 46 is substantially in excess of the effective area of the reduced sealing shoulder 42, the effect of any increase in work pressure from the ram structure is increased sealing pressure, thereby completely eliminating the need for any mechanical clamp or the like.

The electrolyte finds its way along the exterior surface of the electrode through the space in the bore 40 between the electrode and the surface of the bore, over the edge of the working tip 22, and back through the bore 48 in the electrode 20. The exit path may be valved through a needle valve and gauge if it is desired to observe and adjust the back pressure. In the case of electrodes which are intended to be used many times in repetitive production operations, a simple exit hole may be provided in the electrode at its back end. In this case the bore through the electrode mount is closed, as shown, by the flange 12. If it is desired to adjust the back pressure, such may be done by an outlet bushing, needle valve, and conduit leading to a drain. By arranging the exit hole 50 so that it opens upwardly and is visible, it is possible to have an excellent visual indication of the rate of electrolyte flow. This can be used for adjusting the in-feed rate of the electrode 20. The in-feed rate is increased up to the point where the reduction in the height of the fountain stream through the exit hole 50 indicates that the free flow of electrolyte is being impeded by too close a gap between the working tip 32 and the workpiece. This follows the teachings of application Serial No. 772,960 in that the fountain column of liquid constitutes a type of flow meter. The amount of back pressure in the work gap is determined by the size of the exit hole 50, and this usually will be adjusted so that with an in-feed pressure in the order of 50 to 200 p.s.i., the back pressure at the exit hole 50 will range from approximately one foot head of electrolyte solution to a pressure of the order of a half, or even more than that, of the inlet pressure.

It will be appreciated that this arrangement maintains a solid column of liquid all the way around the perimeter of the working tip 22. In consequence of this, the amount of side action is increased over that which occurs when the electrolyte is applied to the bore of the electrode. The result is to increase the overcut; that is, the excess of the size of the hole in the work with respect to the size of the electrode working tip. Accordingly, either the electrode must be advanced more rapidly, the supply voltage of direct current must be lowered, the width (in the direction of advance) of the working tip must be narrowed, or some other means, such as an increase in allowance for the amount of overcut, must be taken.

When the electrolyte is fed around the outside of the electrode, the problem of breakthrough at the exit side is minimized, at least in those instances where the plane of the working tip and the plane of the exit surface are generally parallel. What happens is that, the liquid, during the operation, passing completely around the outside of the electrode and back through its bore with the electrode approaching the exit surface, a breakthrough may be achieved at one point prior to another, but the liquid will continue to pass over the entire active area of the working tip on its way to either of the exit paths; that is, the exit path through the bore 48 of the electrode, or through the newly created opening in the exit surface. In this way the electrode can be advanced so that the working tip passes entirely through the workpiece, eliminating any inturned lip.

It has also been found that with this arrangement the electrode 20 is less subject to lateral vibration or oscillation, as the solid column of liquid surrounding it tends to dampen an oscillating tendency and to absorb feedback energy sufficiently to prevent regeneration of oscilatory impulses.

Where it is preferred to use a back-up member to improve the breakthrough or exit condition, a preferred arrangement is shown in FIG. 2, which illustrates only the workpiece W, a back-up member 52, and associated parts. The back-up member 52, which is made of a plastic similar to the plastic from which the bushing 28 is made, is shown as clamped in any suitable manner—for example, by means of a C clamp 54—to the workpiece. A recess 56 is cut into the plastic back-up member at its face which will be clamped against the exit face of the workpiece W, to a depth slightly greater than the thickness (in the direction of advance) of the working tip 22, or whatever may be the normally uninsulated portion of the electrode 20. Extending away from the work and communicating with the recess 56 is a small bleed hole 58. This arrangement functions substantially as follows: As the electrode 20 breaks through the exit surface of the workpiece W, there will be a slug of material, indicated by the reference character 60, which may have either a generally conical shape (as shown) if the electrode is not internally insulated, or it may have a substantially cylindrical shape if the interior of the electrode is insulated (in this instance the words "conical" and "cylindrical" are used for illustrative purposes only, because it is clear that the shapes will not be a pure cone or cylinder if the shape of the electrode is other than round). As the breakthrough continues, it may be necessary or desirable to prevent having the slug 60 hinge on the last remaining point of attachment to the workpiece W in such a way as to tip and cause short-circuiting against the interior edge of the working tip or against the bore of the electrode if it be uninsulated. The depth of the recess 56 is kept shallow enough to prevent this much cocking of the slug 60. The use of the bleed hole 58 assures that the pressure on the rear side 62 of the slug is kept lower than that on the front side, so that the pressure differential urges the slug downwardly towards the bottom of the recess 56 without rattling or floating in an indeterminate manner in the turbulent electrolyte. When the last point of attachment of the slug 60 is eroded away, the slug moves under the pressure differential so as to close the bleed hole 58. Thus the slug moves out of the way so as to permit a slight additional advance of the electrode 20 to clear away any inturned lip at the exit surface of the work material.

A modified form of arrangement is shown in FIG. 3 wherein the electrode 20 is connected to a header 64 carried on the ram plate 14. The flexible supply conduit 36 is connected to the header 64 by the fitting 38. The electrode 20 projects through a bushing 66 having a bore 68 therein of slightly larger diameter than the tip 22 of the electrode, so that there is a passageway along the outer surface of the electrode and past the tip 22 for the free and easy flow of electrolyte. The bushing 64 is clamped against the entry surface of the workpiece W by a plurality of C shaped clamping devices 70 engaging wings 72 on the bushing, and is sealed thereagainst by an O ring 74 carried in a groove 76 in the forward end of the bushing 66. At its opposite end, the bushing 66 has a cap 78 threaded thereon to compress a sealing ring 80 in conical recesses in the cap and the inlet end of the bushing at 66. The compression of the ring 80 is such as to cause it to seal against the outer surface of the electrode and to prevent the escape of electrolyte confined within the bore 68.

The electrolyte is fed in the customary manner and flows to the electrode toward the workpiece W, around the tip 22, and back through the bore 68. It exits through a fitting 82 connected to a conduit 84 having an adjustable needle valve 86 therein and a pressure gauge to measure the back pressure of the electrolyte in the tube and at the work gap.

By use of the needle valve 86 the back pressure of the electrolyte can be regulated for two purposes. First, it can be regulated to the point where an undesirable longitudinal oscillation does not take place within the bore 48 of the electrode. Furthermore, it provides a cushion along the outer surface of the electrode which inhibits any lateral vibration of the electrode and therefore any contact between the working tip 22 and any other uninsulated part of the electrode, and the bore being formed in the workpiece W.

The basic concept of applying a back pressure on the electrolyte by restricting the outlet as shown generally in FIGS. 1 and 3 hereof, is the sole invention of applicant Lynn A. Williams, and is the subject matter of copending continuation-in-part application Serial No. 212,916, filed July 27, 1962. The specific structure illustrated in FIG. 1 is the joint invention of applicants, and is included in divisional application Serial No. 464,045, filed June 15, 1965.

A different approach to the problem of overcoming lateral vibration of the electrode is illustrated in FIG. 4, which is usable with electrode 20. In this arrangement, at the point where the liquid enters the electrode 20 from the header 64, a plug 90 having a relatively small hole 92 therethrough, is fitted into the electrode so as to dampen oscillation in the column of electrolyte. The electrode 20 is shown insulated both on the inside and outside walls, and the diameter of the working tip in a typical installation is $7/16''$. The bore of the tube is $.333''$. The vibration dampening plug is inserted at the inlet end of the electrode tube and it has a bore 92 $1/16''$ in diameter, and anywhere from $7/16''$ to $1''$ in length. For smaller diameter electrodes, smaller damping restrictions will be used. It is believed that the restricted passage 92 introduces a resistive impedance to vibratory or oscillatory flow of the electrolyte. It is desired that the orifice 92 be kept small to do this, but there still must be sufficient electrolyte flow to prevent starving of the work gap through steaming and gas generation in the electrolyte. The restriction described with respect to a typical electrode is adequate to furnish enough electrolyte, particularly when the electrode 20 is fed with a close working gap against the work material. To prevent arcing and sparking a voltage in the order of 7 to 8 volts is used with an electrolyte solution consisting of 160 pounds of salts in 40 gallons of water. While the restrictive orifice 92 provides a sufficient amount of electrolyte, it does offer a restriction and friction, if there is any tendency of the liquid column to oscillate in the system at any troublesome frequency. Under these conditions the adsorption of oscillation in the narrow passage is too great to permit sustaining the oscillation in the column of electrolyte in the electrode.

In FIG. 5 there is shown another arrangement for preventing vibration of the electrode. In this arrangement a very small hole 94 is formed in the electrode immediately adjacent to its tip 22. After the electrode is made and before it is insulated, a small hole 94 approximately $.060''$ is drilled just behind the working tip. When the electrode is dipped in an epoxy type plastic of sufficient fluidity and low enough viscosity to cover the electrode with a thin film of insulation 24, in the order of $.005''$ in thickness, some of the material naturally is concentrated around and in the small hole near the tip. In some cases the hole may be practically closed and remain so after the resin has been cured by baking at about 350° F. The hole is then enlarged to a diameter of approximately $.030''$ using a small drill usually held in a hand tool so that care can be taken to prevent removing the insulating coating in such a way as to expose any metal surface, which would cause short circuiting in the system. It is probable that the use of this hole, which may be called a "weep hole," introduces a discontinuity or dissymmetry in the system which breaks up the column of electrolyte in the electrode 20, thereby preventing the existence of any sustained oscillation.

In FIGS. 6 and 7, which are comparative figures, there is shown another expedient for damping out the lateral vibration of the electrode 20. FIG. 6 shows the exit end of the electrode which is of a flattened rather than a circular shape, and has a long slot therein, approximately $.025''$ wide, and extending substantially the width of the electrode 98. It has been found that this electrode vibrates excessively. However, when the slot 96 is replaced by the series of closely spaced exit holes 100, as shown in FIG. 7, the vibration is relieved. These holes are .025″ in diameter, and they are spaced .062″ on centers. It will be noted from a comparison of FIGS. 6 and 7, that the two working tips are identical in size and actually are scaled from working tips measuring .630″ by .148″. The holes 100 are provided only at the exit end and the main bore of the electrode may be open and continuous from the inlet end to a point adjacent the exit. It is apparent that these small holes prevent the formation of oscillatory waves of pressure in the liquid which apparently arise along the interior edges of the slot 96.

While a number of expedients for effecting the objectives of the present invention have been shown, it is possible to generalize concerning them to the effect that all of them act upon the column of liquid in the central passage or passages of the electrode in such a way as to break up any tendency of the column of the liquid to oscillate at a regular frequency which is then translated into lateral vibrations. It is, of course, possible to use various of these expedients in combination with each other and with electrodes of different sizes and shapes, and it is expected that this is what will be done. In an attempt to generalize concerning what has been done, it should be noted that the various systems shown include (1) introducing the electrolyte into the work gap around the outer surface of the electrode, thereby cushioning the outer surface of the electrode and providing an easy means of regulating any back pressure in the bore of the electrode by regulating the infeed rate; (2) exiting the electrolyte along the surface of the electrode with a regulated back pressure to provide the cushion, which will in turn have a high impedance to high velocity oscillatory motion; (3) introducing a resilience into the column of electrolyte in the outlet from the system; (4) introducing an impedance into the liquid column to retard the formation of oscillation; (5) breaking up the liquid column in the electrode into small parts; and (6) introducing a dissymmetry into the liquid flow pattern.

It is clear from the foregoing that the objectives which have been claimed for this invention at the outset of the specification have been attained.

While preferred embodiments of the new and improved electrolytic cavity sinking apparatus constituting the present invention have been shown and described, it will be apparent that numerous modifications and variations thereof may be made without departing from the underlying principles of the invention. It is therefore intended, by the following claim, to include all such variations and modifications by which substantially the results of this invention may be obtained through the use of substantially the same or equivalent means.

What is claimed as new and desired to be secured by United States Letters Patent is:

In electrolytic cavity sinking apparatus of the type comprising a hollow conductive electrode, means to advance said electrode toward and into a conductive workpiece, means connected to pass a low voltage, high density direct current between the workpiece and said electrode in a sense to make the workpiece anodic and said electrode cathodic, pump means connected to supply electrolyte to the work gap between the electrode and the workpiece under high pressure and at a high velocity in the work gap, and means at the outlet only of the electrode providing a plurality of electrolyte outlet holes about .025 inch diameter spaced about .062 inch on centers whereby the liquid column is divided as the electrolyte exits from the electrode to inhibit the formation of oscillations therein and to inhibit lateral vibration of the electrode.

References Cited by the Examiner

UNITED STATES PATENTS

| | | | |
|---|---|---|---|
| 2,059,236 | 11/36 | Holslag | 219—69 |
| 2,798,846 | 7/57 | Comstock | 204—143 |
| 2,848,410 | 8/58 | Knuth-Winterfeldt | 204—224 |
| 2,909,641 | 10/59 | Kucyn | 219—69 |
| 2,958,636 | 11/60 | Hershinger | 204—143 |
| 3,002,907 | 10/61 | Williams | 204—143 |
| 3,019,178 | 1/62 | Williams | 204—284 |
| 3,058,895 | 10/62 | Williams | 204—224 X |

FOREIGN PATENTS 335,003   9/30   Great Britain.

OTHER REFERENCES

Bleiweis et al.: "Metals and Alloys," November 1943, pp. 1075–1079.

JOHN H. MACK, *Primary Examiner.*

JOHN R. SPECK, *Examiner.*

Dedication 3,214,360.—*Joseph L. Bender*, Wheeling, and *Lynn A. Williams*, Winnetka, Ill. ELECTROLYTIC CAVITY SINKING APPARATUS. Patent dated Oct. 26, 1965. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]